(12) United States Patent
Booth et al.

(10) Patent No.: US 7,708,160 B2
(45) Date of Patent: May 4, 2010

(54) COLLAPSIBLE CONTAINER

(75) Inventors: Gary E. Booth, Germantown, MD (US); Scott R. Bombaugh, Burke, VA (US); Terry M. Cossin, Castle Rock, CO (US); Edward S. Mascali, Falls Church, VA (US); Paul E. Vogel, Dunn Loring, VA (US); Ralph E. Walker, Washington, DC (US)

(73) Assignee: United States Postal Service, Washington, DC (US)

( * ) Notice: Subject to any disclaimer, the term of this patent is extended or adjusted under 35 U.S.C. 154(b) by 186 days.

(21) Appl. No.: 11/329,405

(22) Filed: Jan. 10, 2006

(65) Prior Publication Data

US 2007/0158345 A1 Jul. 12, 2007

(51) Int. Cl.
*B65D 8/14* (2006.01)

(52) U.S. Cl. ............... 220/4.28; 220/666; 220/9.3; 220/4.34

(58) Field of Classification Search ........... 220/9.1–9.4, 220/666, 4.28, 4.33, 4.34, 6, 7; 383/121.1; 206/600
See application file for complete search history.

(56) References Cited

U.S. PATENT DOCUMENTS

| | | | | |
|---|---|---|---|---|
| 1,148,948 A | * | 8/1915 | Benjamin | 383/121.1 |
| 2,008,176 A | * | 7/1935 | Fritsche | 280/639 |
| 2,936,189 A | * | 5/1960 | Pearson | 292/42 |
| 2,975,929 A | * | 3/1961 | Sjoblom | 220/4.33 |
| 3,372,829 A | * | 3/1968 | Averill | 220/6 |
| 3,865,269 A | * | 2/1975 | Coleman | 220/6 |
| 3,879,053 A | * | 4/1975 | Chvala | 280/6.15 |
| 4,150,762 A | * | 4/1979 | Brunette | 220/485 |
| 4,630,746 A | | 12/1986 | Fortenberry | |
| 4,662,532 A | * | 5/1987 | Anderson et al. | 220/7 |
| 4,715,508 A | * | 12/1987 | Schurch | 220/7 |
| 4,832,222 A | * | 5/1989 | Storton | 220/6 |
| 4,923,079 A | * | 5/1990 | Foy | 220/7 |
| 4,938,359 A | | 7/1990 | Bernstein | |
| 5,016,926 A | * | 5/1991 | Sharp et al. | 292/42 |
| 5,056,667 A | * | 10/1991 | Coogan | 206/600 |
| 5,161,709 A | * | 11/1992 | Oestreich, Jr. | 220/6 |
| 5,261,550 A | * | 11/1993 | Karpisek | 220/4.33 |
| 5,263,601 A | * | 11/1993 | Borow | 220/6 |
| 5,415,311 A | * | 5/1995 | Coogan | 220/6 |
| 5,437,384 A | * | 8/1995 | Farrell | 220/1.5 |
| 5,551,565 A | | 9/1996 | Kendrick | |

(Continued)

*Primary Examiner*—Anthony D Stashick
*Assistant Examiner*—Christopher B McKinley
(74) *Attorney, Agent, or Firm*—Knobbe, Martens, Olson & Bear LLP

(57) ABSTRACT

A collapsible container having a base with top and bottom surfaces, a plurality of support members, legs attached to the base and configured to support a second collapsible container placed on a first collapsible container and a plurality of side panels, wherein at least one of the side panels is configured to lock in place in at least one position, wherein at least one of the side panels has both a foldable portion and a fixed portion and wherein the system provides for load bearing members for securing another collapsible container or device on top of a first collapsible container in either the folded or the extended configuration. Some embodiments of the collapsible container include an anchor member configured to anchor the collapsible container to a surface. Methods of stacking and methods of manufacturing the above embodiments are also disclosed.

35 Claims, 14 Drawing Sheets

U.S. PATENT DOCUMENTS

| | | | |
|---|---|---|---|
| 5,622,277 A * | 4/1997 | Van Giezen et al. | 220/6 |
| 5,653,354 A * | 8/1997 | Olson | 220/9.1 |
| 5,702,001 A * | 12/1997 | Russell et al. | 206/388 |
| 5,897,018 A * | 4/1999 | Pruitt | 220/603 |
| 6,010,145 A * | 1/2000 | Liu | 280/655.1 |
| 6,044,998 A * | 4/2000 | Schearer et al. | 220/6 |
| 6,170,686 B1 * | 1/2001 | Flores | 220/4.33 |
| 6,691,885 B2 * | 2/2004 | Brown | 220/7 |
| 6,718,635 B2 | 4/2004 | Cheng et al. | |
| 6,857,560 B2 | 2/2005 | Kutner | |
| 6,863,180 B2 | 3/2005 | Apps et al. | |
| 6,892,895 B2 | 5/2005 | Zhu et al. | |
| 6,899,242 B2 | 5/2005 | Overholt et al. | |
| 6,915,948 B2 | 7/2005 | George | |
| 6,918,502 B1 | 7/2005 | Overholt et al. | |
| RE38,770 E | 8/2005 | Gilbert | |
| 6,935,526 B1 | 8/2005 | Laggar | |
| 6,948,632 B2 | 9/2005 | Kellogg et al. | |
| 6,955,273 B2 | 10/2005 | Hartwall | |
| 6,955,365 B2 | 10/2005 | Giampavolo et al. | |
| 6,981,605 B2 * | 1/2006 | Kasuya et al. | 220/6 |
| 7,004,344 B2 | 2/2006 | Fulton et al. | |
| D516,313 S | 3/2006 | Pavli | |
| 7,014,057 B2 | 3/2006 | Wang | |
| 7,017,765 B2 | 3/2006 | Overholt | |
| 7,017,766 B2 | 3/2006 | Hsu et al. | |
| 7,017,781 B2 | 3/2006 | Provenza | |
| 7,048,134 B1 * | 5/2006 | Hagan | 220/6 |
| 7,108,135 B2 * | 9/2006 | Park | 206/711 |
| 2003/0127456 A1 * | 7/2003 | Brown | 220/4.33 |
| 2004/0004078 A1 * | 1/2004 | Tanaka | 220/6 |
| 2004/0222222 A1 * | 11/2004 | Parnall et al. | 220/6 |
| 2005/0121358 A1 * | 6/2005 | Andre et al. | 206/600 |

* cited by examiner

COLLAPSIBLE CONTAINER

BACKGROUND OF THE INVENTION

1. Field of the Invention

This invention relates generally to containers. More specifically, the invention relates to collapsible containers.

2. Description of the Related Art

Collapsible containers are used for shipping, hauling and/or storage of a variety of types of goods. Examples of collapsible containers may be found in U.S. Pat. No. 6,955,273 to Hartwall, U.S. Pat. No. 6,948,632 to Kellogg, et al., U.S. Pat. No. 6,918,502 to Overholt, et al. and U.S. Pat. No. 4,630,746 to Fortenberry.

SUMMARY OF THE INVENTION

In one embodiment, a collapsible container comprises a base having top and bottom surfaces and a plurality of support members attached to the base and configured to support the collapsible container. This embodiment also comprises legs attached to the base and configured to support a second collapsible container placed on a first collapsible container and a plurality of side panels having edges. One of the edges of each of the side panels in this embodiment connects the side panel to the base. At least one of the side panels is a foldable portion and a fixed portion.

In some embodiments, the collapsible container comprises means for releasing at least one spring-loaded slam latch, means for locking the at least one spring-loaded slam latch and/or means for folding a side panel.

In another embodiment, a container comprises a base having top and bottom surfaces and legs configured to attach to the base and a plurality of side panels. Each of the side panels has at least one edge that connects the side panel to the base. This embodiment also comprises at least one anchor member, which is attached to the base and which is configured to extend downwardly from the base and to anchor the container to a surface. In some embodiments, the anchor member is configured to anchor the container to a substantially horizontal surface and thereby substantially prevent lateral movement of the container or to anchor the container to a mechanical system for lateral migration of the container or to anchor the container to a moving vehicle.

In one embodiment a collapsible container comprises a base with top and bottom surfaces, legs attached to the base, a plurality of side panels attached to the base and leg extension members rotationally attached to the legs. The leg extension members will support the weight of a load placed on top of the collapsible container and when the leg extension members are in an upright position. When in a folded position, however, the legs are the primary load bearing members for a load placed on top of the collapsible container.

In another embodiment a collapsible container comprises a base with top and bottom surfaces, legs attached to the base, a plurality of side panels attached to the base and leg extension members. The leg extension members comprise a cavity on one end for receiving and securing a load placed on top of the collapsible container when the leg extension members are in an upright configuration. When the leg extension members are in a folded configuration, divots are exposed on the legs for receiving and securing the load placed on top of the collapsible container.

In another embodiment, a collapsible container comprises a base having top and bottom surfaces, legs and four side walls that are fixed in place. These four side walls are connected to and extend upward from the base. This embodiment further comprises two side panels with edges adjacent to and substantially parallel to an edge of said four side walls and two end panels with edges adjacent to and substantially parallel to an edge of said four side walls. The two side panels and the two end panels are configured to lock in an upright position and to fold toward the base. Further, the base, the four side walls, the side panels and the side walls may form five sides of a cube.

In some embodiments, a plurality of the collapsible containers are configured to be stacked three high when the collapsible containers are empty and/or when the end panels and the side panels comprising leg extension members are in a folded position. In some embodiments, the collapsible containers are configured be stacked two high when the side panels and the end panels are locked in an upright position. In some embodiments, the collapsible container further comprises a label holder pocket or a board for routing and/or handling information.

In some embodiments, the collapsible container comprises means for folding an end panel about an axis and/or means for folding a side panel comprising leg extension members about an axis in an inward or outward direction.

Another embodiment of the invention comprises a method of stacking collapsible containers. The collapsible containers comprise side panels and end panels wherein at least one side panel or end panel has both a fixed portion and a moveable portion. This method comprises folding at least one of the side panels or at least one of the end panels about an axis in an inward or outward direction, aligning divots on one end of the legs of one of the collapsible containers with protrusions on another end of the legs from another of the collapsible containers and placing one container on top of another.

Another embodiment of the invention is a method of stacking collapsible containers. A collapsible container comprises side panels wherein at least one of the side panels comprises a non-moveable portion and a moveable portion. In this embodiment, the moveable portion is locked in a fixed and upright position. The method comprises aligning cavities or protrusions on leg extension members associated with a first collapsible container with protrusions or divots on legs associated with a second collapsible container and placing the protrusions or divots of the legs of the second collapsible container onto the cavities or protrusions of the first collapsible container.

Another embodiment of the invention is a method of stacking at least one pallet onto a collapsible container. The collapsible container comprises side panels and end panels wherein at least one side panel or at least one end panel comprises a fixed portion and a moveable portion. The method comprises folding at least one side panel or at least one end panel about an axis in an inward or outward direction, aligning at least one pallet over the collapsible container and lowering the at least one pallet to rest on the collapsible container.

Another embodiment of the invention is a method of anchoring a collapsible container. The collapsible container comprises side panels and end panels and includes an anchor member movably attached to the collapsible container. The method of anchoring comprises lowering the anchor member from the collapsible container and attaching a portion of the anchor member to a surface below the collapsible container.

In another embodiment of the invention, a collapsible container comprises side panels and end panels. At least one side panel or end panel includes both a fixed portion and a moveable portion. The collapsible container also comprises means for folding at least one of the side panels or at least one of the end panels about an axis in an inward or outward direction and means for securing a collapsible container on top of another collapsible container.

In another embodiment of the invention, a collapsible container comprises side panels and end panels. At least one side panel or end panel comprises a fixed portion and a moveable portion. The collapsible container further comprises means for locking at least one of the side panels in an upright position and means for securing one of the collapsible containers on another of the collapsible containers.

Another embodiment of the invention provides a collapsible container comprising side panels and end panels. At least one of the side panels or one of the end panels comprises a fixed portion and a moveable portion. The collapsible container further comprises means for folding side panels and end panels about an axis in an inward or outward direction and means for resting the at least one pallet on the collapsible container.

In another embodiment of the invention, a collapsible container comprises side panels and end panels. At least one of the side panels or the end panels comprises a fixed portion and a moveable portion. The collapsible container further comprises an anchor member movably attached to the collapsible container, means for lowering the anchor member from the collapsible container and means for attaching a portion of the anchor member to a surface below the collapsible container.

Another embodiment of the invention is a method of manufacturing a collapsible container. The method comprises attaching four walls to a base, attaching legs to the base, attaching side panels to the legs via a pivot or hinge and locking the side panels in an upright position through the use of a guidebolt and/or spring-loaded slam latch.

Another embodiment of the invention is a method of manufacturing a collapsible container. The method comprises attaching panels to a base, attaching legs to the base and attaching an anchor member to the base. The anchor member is configured to anchor the collapsible container when the anchor member is lowered from the base to a surface.

Another embodiment of the invention is a method of manufacturing a cable assembly. The method comprises attaching panels to a base, attaching a spring-loaded slam latch to at least one of the panels and attaching a cable to the spring-loaded slam latch, such that the spring-loaded slam latch is configured to release at least one of the panels from a locked position when the cable assembly is pulled.

Another embodiment of the invention is a method of manufacturing a collapsible container. The collapsible container comprises four panels. Each panel includes a moveable portion and a fixed portion. The method comprises connecting the fixed portion of the four panels to a base so as to define five sides of a cube and attaching and/or forming a protrusion and/or a divot to at least one of either the moveable portion or the fixed portion.

BRIEF DESCRIPTION OF THE DRAWINGS

These and other aspects of the invention will be readily apparent from the description below and the appended drawings, in which like reference numerals refer to similar parts throughout, which are meant to illustrate and not to limit the invention, and in which.

DETAILED DESCRIPTION OF EMBODIMENTS

Figure 1:
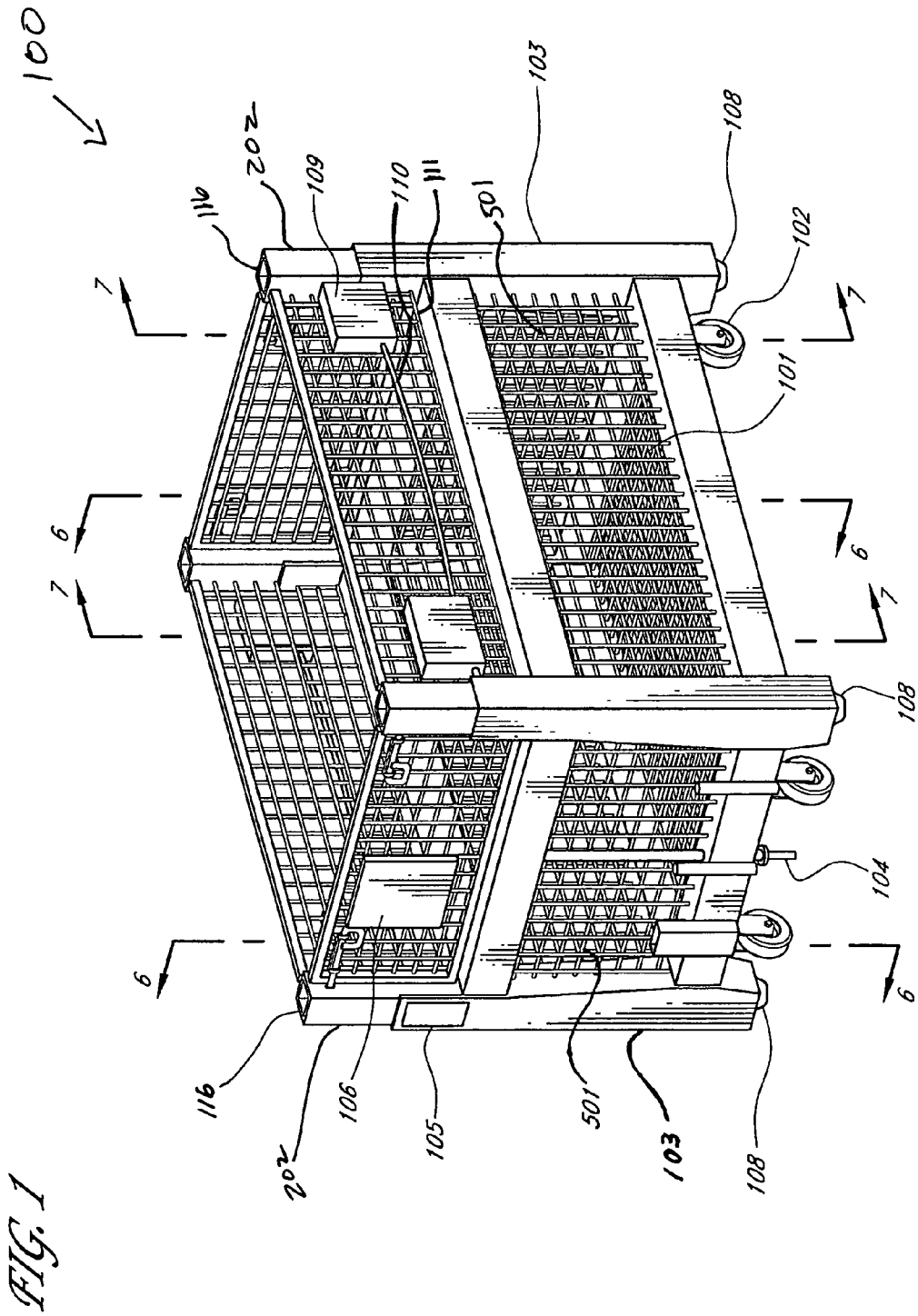
FIG. 1 is a perspective view of a collapsible container illustrating all side panels and end panels in upright and locked positions.

Traditionally, various types of containers have been used for shipping and hauling goods and materials. In many industrial and commercial applications, containers are used to transport goods to and from manufacturers, suppliers, stores or a variety of types of processing centers throughout a given network. Containers may be dispatched full of goods. Often, however, containers are not full to capacity, but nevertheless must be dispatched by trucks and delivered to the next destination in a timely manner. Many of the partially filled containers are transported to meet the delivery deadlines. This does not take full advantage of the capacity of the trucks and trailers transporting the containers. Transporting multiple containers at less than full capacity reduces the efficiency of the shipping process and in the aggregate may be very costly. Multiple trips to haul empty storage containers is not effective; a delivery system can thus be delayed and/or cause backhauling problems. Backhauling may therefore increase the total time required for the shipping and hauling.

As mentioned above, backhauling or returning of empty collapsible containers can be both costly and unproductive. Nevertheless, empty containers must be transported so that they may be redistributed to high volume processing centers. Inevitably, high volume locations ship out more containers than they receive. At the same time, low volume centers receive more containers than they can reasonably use and ship. This causes an imbalance of empty containers and full containers located where they should not be. Empty containers must be transported from low to high throughput centers. Thus, a rigid container design does not optimize the shipping of goods transported in commercial trailers.

Herein disclosed is a container suitable for shipping and hauling goods which has the benefit of collapsing. This container collapses to a smaller external size and may store and/or transport a less than capacity volume of goods in a folded state. A collapsible container allows the dispatch of either full or partially loaded containers and takes full advantage of space configurations in transport vehicles.

The collapsible container maintains efficiency proportional to both the collapsed and the non-collapsed volume capacity of the container. Collapsible containers may be stacked in either of two configurations. First, full collapsible containers may be stacked with all panels in upright and locked positions. Second, empty collapsible containers or partially filled collapsible containers may be stacked with all panels in folded positions. These stacking configurations may eliminate wasted space and thus take full advantage of commercial and industrial truck and trailer configurations.

In this manner, industrial or commercial low volume processing centers can dispatch goods in collapsed containers. This increases use of containers and helps to correct an imbalance of empty containers between high and low volume processing centers. A container in a collapsed state may reduce the cost of backhauling empty containers because a much greater number of collapsed containers may be loaded onto a truck with a finite space than the number of unfolded containers hauling goods in the same finite space. Backhauling can therefore be reduced or eliminated.

FIG. 1 illustrates one preferred embodiment of the invention. In this perspective view a collapsible container 100 includes a base 101 with wire matrix top and bottom surfaces. Of course, the base 101 and all other surfaces such as walls and panels of the invention can be solid or include openings such as a mesh. Further, the wire matrix may be composed of any of various types of metal, wood, plastic, fiberglass or other materials suitable for creation of a base 101 or other component configured to hold goods.

FIG. 1 shows a plurality of side panels having edges. One edge of each of the side panels connects the side panel to the base 101 though the use of solder, adhesive or mechanical means including, but not limited to the following: screws, clamps, nails, and/or interlocking parts. In this embodiment, the side panels are shown as being attached to the base 101 and are positioned on opposite sides of the base 101 from other side panels. Side panels may comprise materials appropriate for construction of a base 101 discussed above.

FIG. 1 also shows a plurality of support members (here casters 102) attached to the base 101. The support members are weight bearing and are configured to support the collapsible container when the collapsible container is empty as well as when it is filled to capacity with goods. Support members, including casters 102 may be made from various combinations of materials including wood, metal, plastic, fiberglass, rubber or other materials capable of supporting the bulk of a collapsible container. In the embodiment shown in FIG. 1, four casters 102 are attached to the base 101. Casters 102 may be in a fixed position or may be swivel casters. Both swivel casters and fixed casters, however, are configured so that a portion of the caster 102 rotates. This rotation allows the collapsible container to move laterally when not anchored to a surface. A swivel caster 102 may also rotate as an entire unit up to a full 360 degrees of rotation while still supporting the base 101 of the collapsible container. This type of swivel caster rotation allows the collapsible container 100 to be maneuverable in confined spaces and to change directions when moving laterally on a surface.

The base 101 is also shown attached to legs 103. The legs 103 may be fashioned of steel or other suitable metals, plastic, fiberglass, wood, or other materials formed into tubes or posts capable of being attached to a base 101 and capable of supporting the legs 103 of a second collapsible container placed on top of a the legs 103 of a first collapsible container. In some embodiments, the legs 103 are placed at the corners of the base 101 so as to attach to and provide support for a side panel(s) and/or end panel(s).

FIG. 1 shows an anchor member (here a tow pin 104) attached to the base 101 of the collapsible container. Other types of anchor members include, but are not limited to the following: chains, ropes, belts, clamps, other structures designed to anchor the collapsible container. The anchor member may be lowered by utilizing a screw or by utilizing a latch to release the anchor member and allow it to slide through holders on the collapsible container 100 until it strikes a surface below the base of the collapsible container. Here, the tow pin 104 extends downwardly from the base 101 and it is configured so that it may be lowered to a surface below the base 101 to mate with that surface or with a receiver (not shown) located in or on that surface, to thereby anchor the collapsible container. With the tow pin 104 lowered to mate with a stationary surface, the tow pin 104 prevents lateral movement of the collapsible container.

The tow pin 104 may be lowered to anchor the collapsible container 100 placed in a commercial or industrial vehicle so as to prevent the collapsible container 100 from movement within the vehicle during shipping. The tow pin 104 may also be lowered to anchor the collapsible container 100 to a mechanical system towline conveyor for lateral movement of the collapsible container 100 within a processing center. The tow pin 104 may thus be attached to a receiver used for towing. The receiver may be a hitch on a vehicle or it may comprise a receiver on a pathway within a towline conveyor system so as to move the collapsible container 100 within a processing center. Towline conveyors may assist in commercial and industrial movement of goods within a processing center. Towline conveyor systems are designed for movement of materials and products over monoplane and multiplane paths. Some towline conveyor systems, such as the type manufactured by FMC Technologies, permit efficient movement of virtually any material on chain powered pathways. Towed vehicles and containers, such as the collapsible container 100, may be manually engaged or disengaged anywhere along the rout or automatically activated at preselected stations.

In this embodiment a label holder pocket 105 is located on the upper face of a leg 103 to provide for placement of labels that contain information about routing and/or handling information of the goods within or merely the contents of the collapsible container 100. A display panel 106 such as a board or plastic surface is affixed to the surface of one of the foldable panels. The board 106 allows for the display of routing and/or handling information for the goods within the collapsible container 100 as it moves within a processing center or transported between shipping locations.

In some embodiments, the legs 103 have at least two ends. In some embodiments leg extension members 202 are rotationally attached to the legs 103. Leg extension members 202 have cavities 116 or protrusions 108 which may mate with a corresponding protrusion 108 or divot 107 in the bottom of a leg 103 when leg extension members 202 are in an upright position and two collapsible containers 100 are placed one on top of another. Cavities 116 are concave structures or holes configured to mate with a corresponding protrusion 108. A protrusion 108 is a convex or knoblike projection member configured to mate with a cavity 116 or a divot 107 discussed in greater detail with reference to FIG. 2

The protrusions 108 may be made of a material different than the composition of the corresponding leg 103 or may be sculpted onto the leg 103 as a continuous unit. Suitable materials include those that may be used for the formation of the leg 103. The cavities 116 may be fashioned onto the end of a leg extension member 202 as from a separate suitable material or may be sculpted onto the leg extension member 202 as part of a continuous unit.

Illustrated in FIG. 1, certain panels may be locked in place via a spring-loaded slam latch 109. The spring-loaded slam latch is located near the edge of the side panel so as to lock side panel to the leg 103. A cable assembly 110 may connect two or more spring-loaded slam latches 109. The structure of the spring-loaded slam latch 109 and cable assembly 110 will be discussed in greater detail below with reference to FIG. 5.

In another embodiment, the legs 103 are also configured to provide support for at least one of four fixed walls 501. The four fixed walls 501 are connected to and extend upward from a base 101 and are comprised substantially of a similar structure and type of materials used to construct the base 101 discussed above. The four walls 501 are "fixed" in that they do not move or fold from their position attached to the base 101. The four fixed walls 501 are connected to the base 101 though the use of solder, adhesive or mechanical means including, but not limited to the following: screws, clamps, nails, and/or interlocking parts.

In one embodiment, two end panels comprised substantially of a similar structure and type of materials as the base 101 have an edge which is substantially adjacent to and substantially parallel to an edge of the fixed four walls 501. The two end panels are also configured to fold toward the base 101. In one embodiment, two side panels comprised substantially of a similar structure and type of materials as the base 101 have an edge which is substantially adjacent to and substantially parallel to the fixed four walls 501. The two side panels are configured to fold down about their lower edge 111 toward the base 101.

Figure 2:
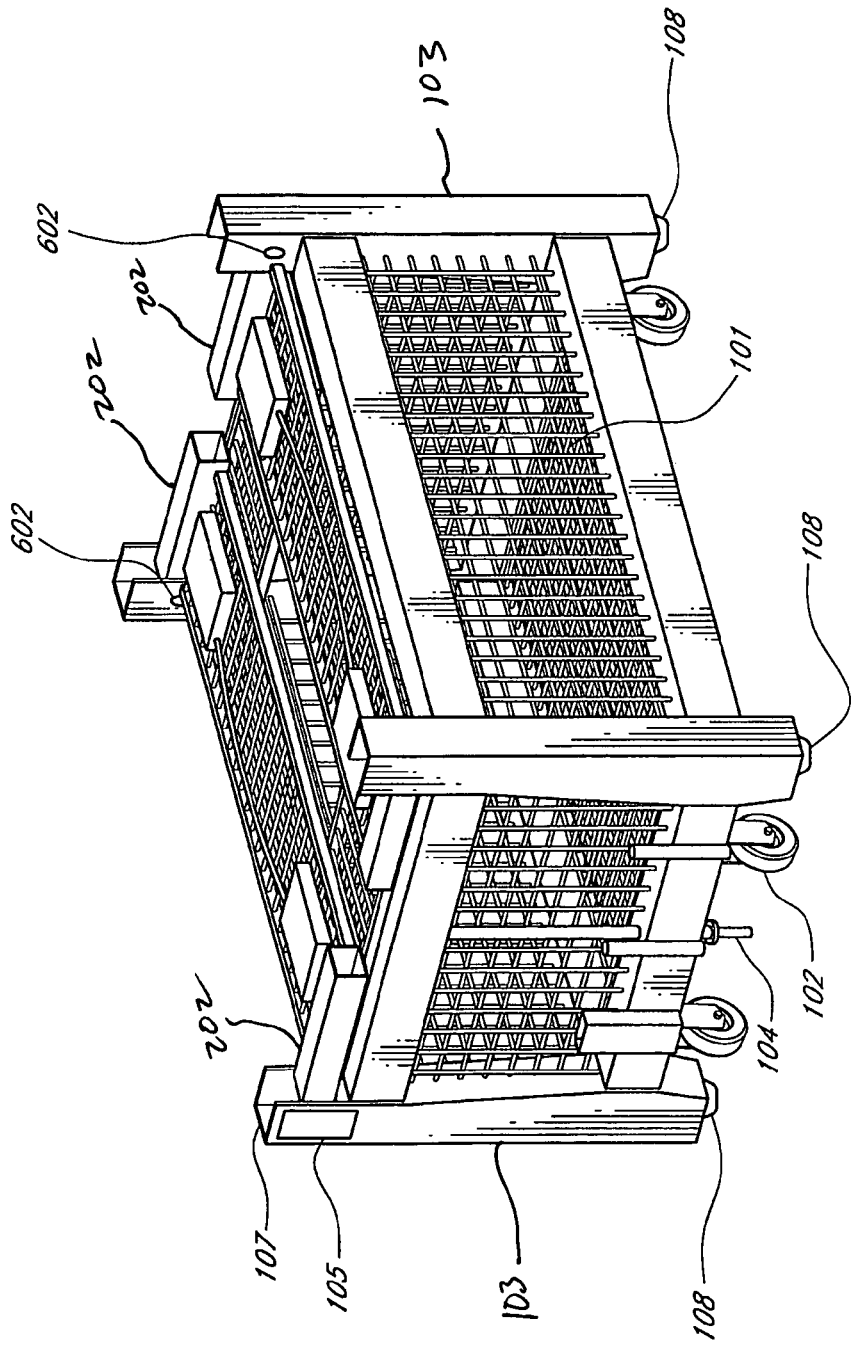
FIG. 2 is a perspective view of the collapsible container of FIG. 1, illustrating all side panels and end panels in folded positions.

FIG. 2 illustrates a perspective view of the collapsible container 100 of FIG. 1, showing all side panels and end panels in folded positions. In some embodiments, the legs 103 have at least two ends. One end of a leg 103 may include a divot 107 or protrusion 108 designed to mate with a corresponding protrusion 108 or divot 107 on another end of a leg 103 when the leg extensions 202 are in a folded position.

Also illustrated in FIG. 2 is an axis of rotation 602. The leg extensions 202 attached to the end panels of this embodiment are able to fold about an axis of rotation 602 when folding between an upright and locked position and a folded position. The leg extensions 202 in this embodiment connect the end panel to the legs 103 via a pin at the axis of rotation 602.

Figure 3:
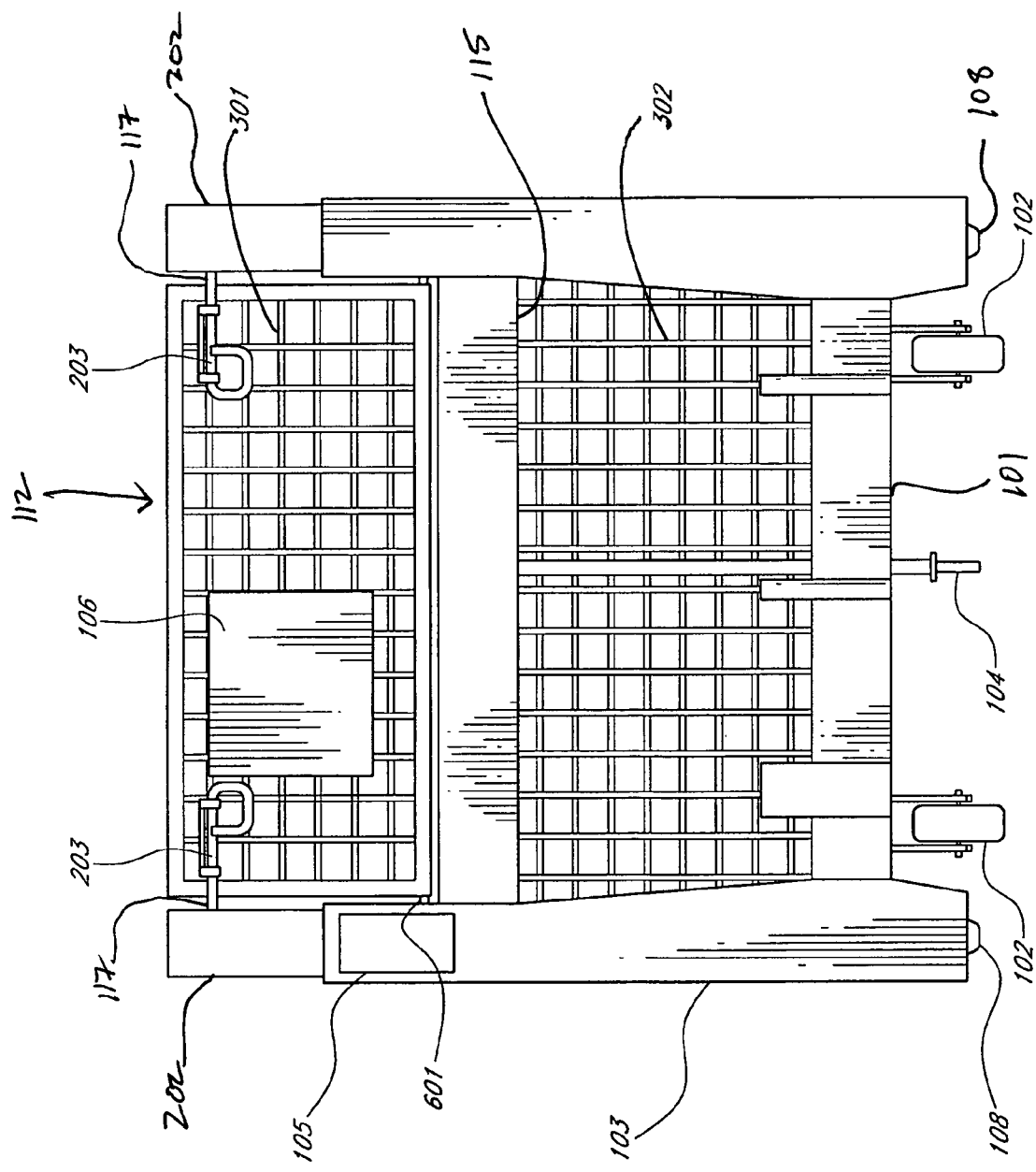
FIG. 3 is a front elevational view of an end panel.

FIG. 3 illustrates an exterior elevational view of an end panel 112. The end panel 112 is comprised substantially of a wire matrix of the type and material described previously.

A guidebolt 203 located on the edge of the end panel 112 in a configuration which aligns its extendible end 117 with a receiver such as an aperture in the adjacent leg extension 202 so that when the end 117 is in the receiver, the end panel 112 is retained in an upright position and rotation of the end panel 112 about an axis 601 is prevented. The guidebolt 203 may also "release" the end panel 112 so that it may be folded about an axis 601 by retraction of the end 117 of the guidebolt 203 leg extension member 202. The guidebolt 203 releases the end panel 112 when it is lifted and the pin pulled so as to disengage the guidebolt 203 from the side wall.

The embodiment of FIG. 3 also illustrates the end panel 112 having a foldable portion 301 and a fixed portion 302. The foldable portion 301 may "fold" or move in relation to the fixed portion 302 while the fixed portion 302 does not move. In some embodiments the fixed portion 302 includes a horizontal top member 115, which may be solid or hollow and which may be constructed from materials including various types of metals, wood, plastic, fiberglass or other materials suitable as components of a collapsible container 100.

The end panel 112 of FIG. 3 may be attached along its lower edge to the base 101. In some embodiments two end panels 112 are positioned on opposite sides of the base 101 from each other. For example, two of the end panels 112 of the type illustrated in FIG. 3 are positioned on opposite sides of the base 101 as illustrated in FIG. 1.

Figure 4:
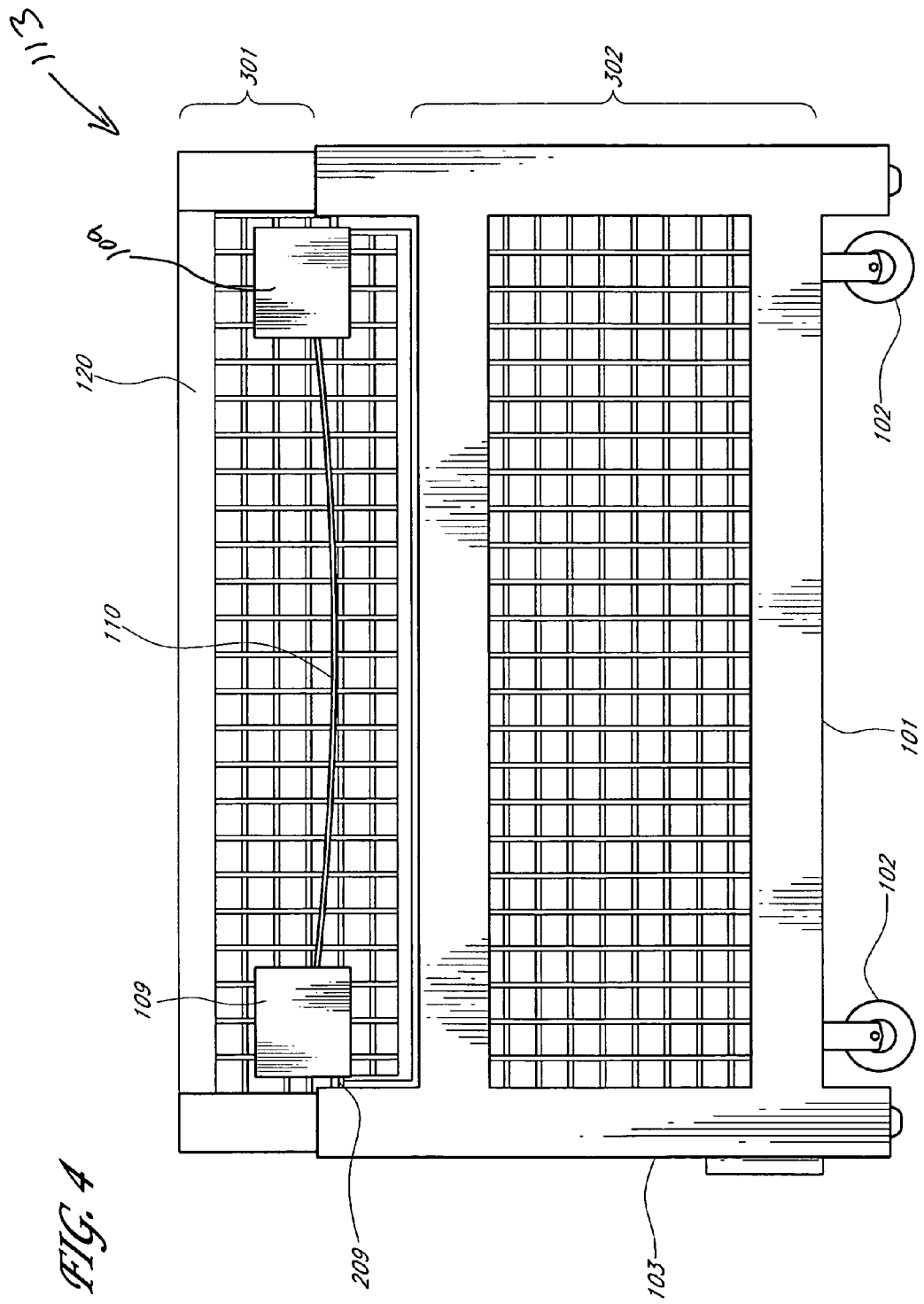
FIG. 4 is a front elevational view of a side panel.

FIG. 4 shows an exterior elevational view of a side panel 113. At least a portion of the side panel 113 of this embodiment is comprised substantially of a wire matrix of the type and composition discussed above. The side panel 113 is locked in place via a spring-loaded slam latch 109 located on the edge of the side panel 113. The spring-loaded slam latch 109 includes a pin 209 extending from the spring-loaded slam latch 109 so as to mate with a receiver such as an aperture in the side of the leg 103. As part of the spring-loaded slam latch 109, the pin 209 holds the side panel 113 in place. The pin 209 will be discussed in greater detail below with reference to FIG. 5. Briefly, however, when removed from the leg 103, the pin 209 allows the side panel 113 to be released from an upright and locked position as shown in FIG. 1 and to move to a completely folded position as shown in FIG. 2. As mentioned previously, a cable assembly 110 may connect between two or more spring-loaded slam latches 109 to permit substantially simultaneous operation of these slam latches. In this particular embodiment of the present invention, FIG. 4 shows a cross-bar 120 that increases structural support for the side panel 113 such that in either a folded or an upright position, the cross-bar 120 (or the moveable portion 301 of the side panel 113, which is supported by the cross-bar 120) may support a load placed directly upon it. This enables this embodiment to support an increased load placed upon it. The housing of the spring-loaded slam latch 109 may also serve to support a load placed upon it when the movable portion 301 of the side panel 113 is in a folded position. The structural support of the housing of the spring-loaded slam latch 109 and the cross-bar 120 will be further discussed in reference to FIG. 10.

Figure 5:
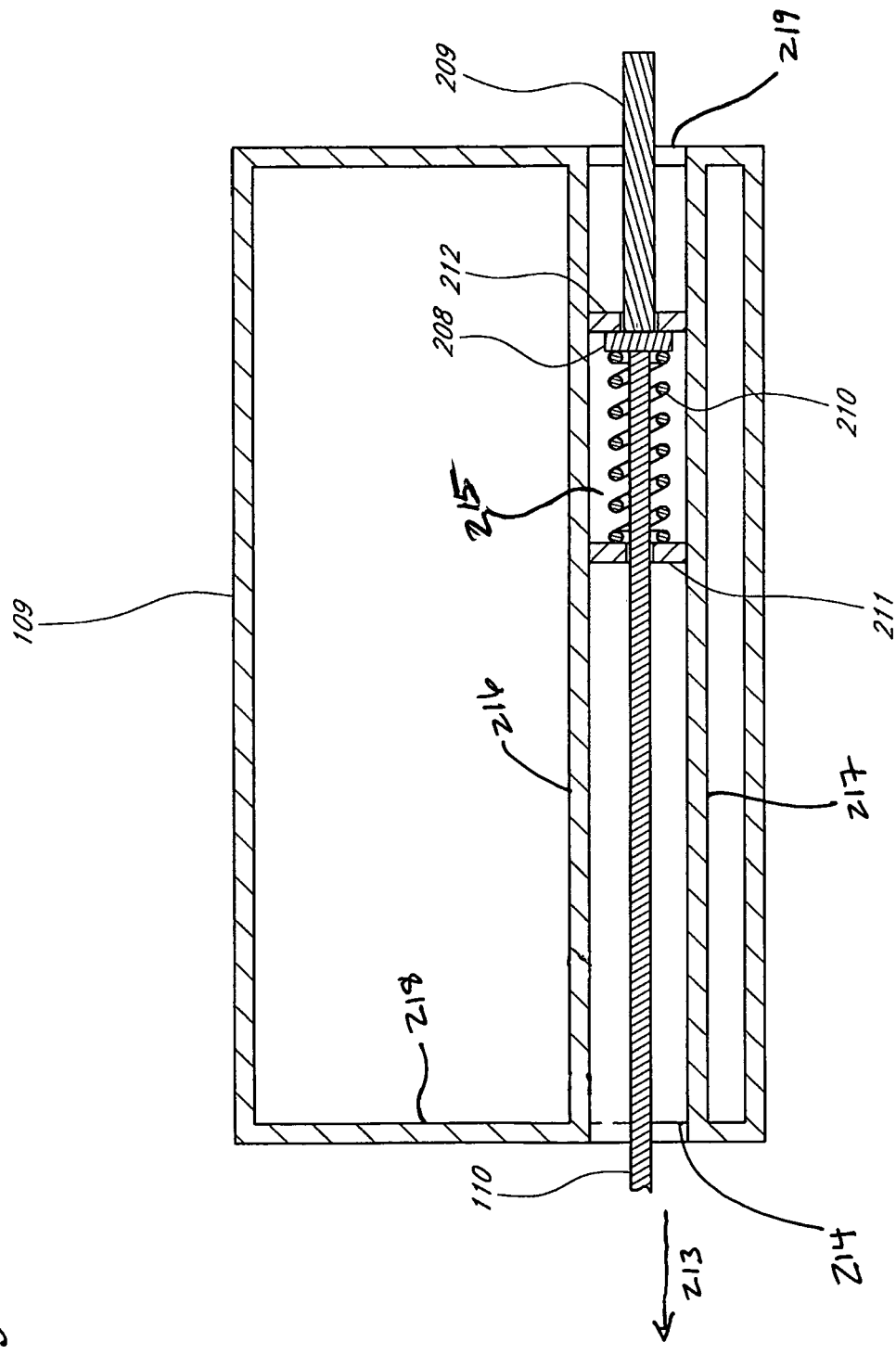
FIG. 5 is a cut-away view of a slam latch for use in the collapsible container.

FIG. 5 shows a cut-away view the spring-loaded slam latch 109. The spring-loaded slam latch 109 includes a passage 214 defined by side walls 216 and 217. The ends of the passage 214 are defined by walls 218 and 219 of the spring-loaded slam latch 109. The walls 218 and 219 each have an aperture located in alignment with the passage 214 so as to permit slidable passage therethrough of a portion of the pin 209 and the cable 110.

Also located in the passage 214 is a spring chamber 215 having side walls defined by a portion of the walls 216 and 217 and having end walls 211 and 212 which extend across the passage 214. Each of the end walls 211 and 212 have an aperture therein. The aperture in end wall 211 is configured to accommodate the through passage of the cable 110 while the aperture in end wall 212 is configured to accommodate the through passage of the pin 209. Extending longitudinally within the spring chamber 215 is a coiled spring 210. In this embodiment the cable 110 passes first through the aperture in the wall 218, then through this wall 211 and through the center of the coiled spring 210. The forward end of the cable 110 is attached to a stopper 208 located within the spring chamber 215 and between the wall 212 and the adjacent end of the spring 210. The stopper 208 is also attached to the forward end of the pin 209 which passes through the wall 212 and then passes out of the passage 214 through the aperture in the wall 219. The pin 209 extends outward and when fully extended into an aperture and into a leg 103 of the collapsible container 100 as shown in FIG. 4. The wall 212 prevents the stopper 208 from completely releasing tension on the spring 210.

Pulling the cable 110 in the direction of the arrow 213 compresses the spring 210 against the wall 211 and permits retraction of the pin 209 out of the leg 103. The spring-loaded slam latch 109 may also be released by pushing the pin 209 to compress the spring 210 against the wall 211. The spring-loaded slam latch 109 may be "locked" by allowing the spring 210 to push against the wall 211 and extend the spring 210 until the stopper 208 comes in contact with the second wall 212 and the pin 209 is pushed out of the spring-loaded slam latch to its fullest extent possible. In this position, the spring-loaded slam latch 109 has locked the pin 209 in place until such time as compression of the spring 210 against the wall 211 may release the pin 209.

Figure 6:
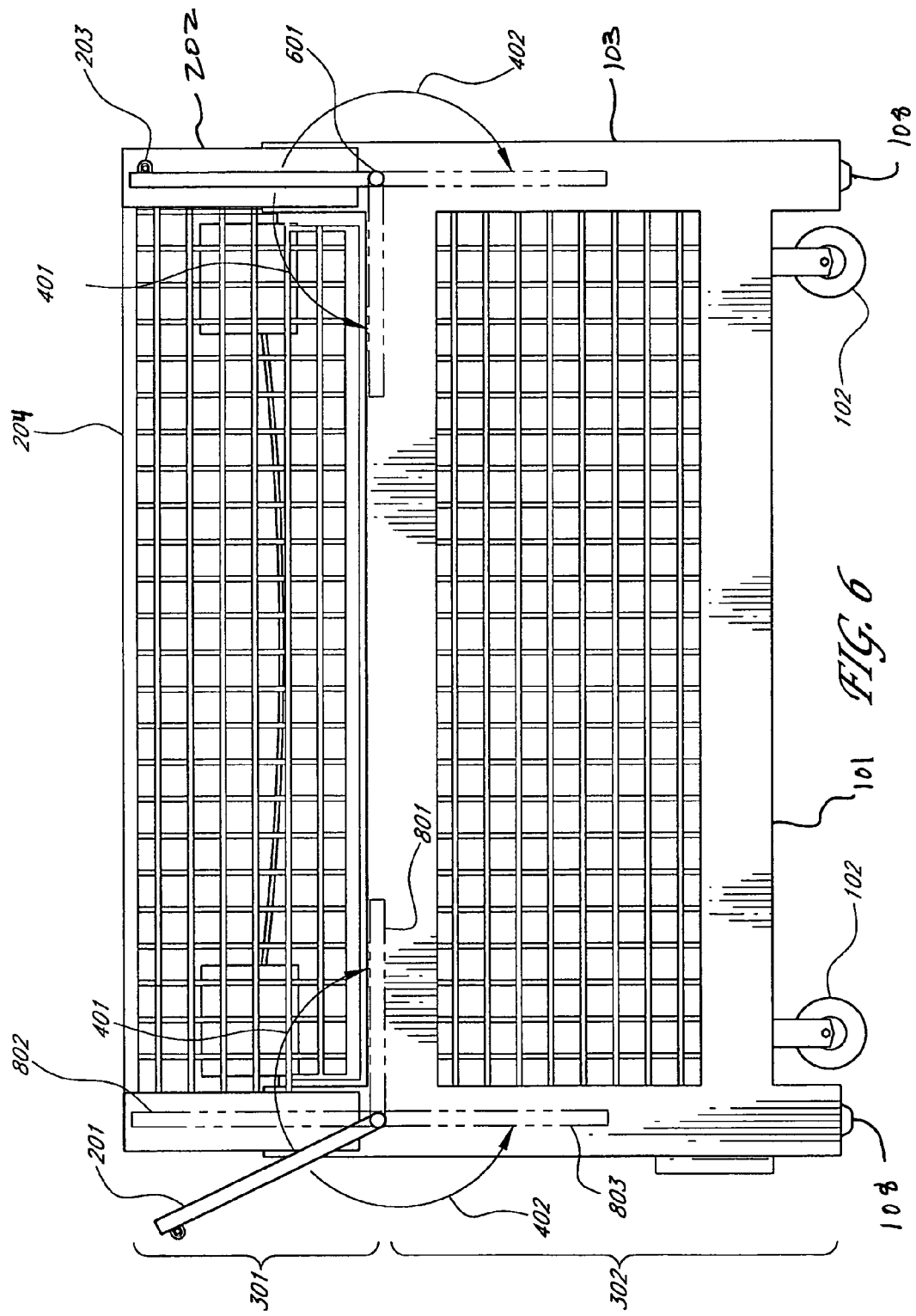
FIG. 6 is a cut-away view of the collapsible container of FIG. 1 taken along the lines 6-6 and viewed in the direction of the arrows labeled 6.

FIG. 6 is a cut-away view of the collapsible container of FIG. 1 taken along the lines 6-6 and viewed in the direction of the arrows labeled 6. In this embodiment an end panel 201 is illustrated in an upright position 802. The side panel 204 in this embodiment, including leg extension members 202, will be discussed in greater detail below with reference to FIG. 7.

The embodiment of FIG. 6 includes a foldable portion 301 and a fixed portion 302. As mentioned above, the foldable portion 301 may be folded and the fixed portion 302 does not move. The foldable portion 301 in this embodiment is the end panel 201. The end panel 201 may be "locked" in an upright position 802 by at least one guidebolt 203 in the manner previously discussed. When the guidebolt 203 is released, the end panel 201 may fold inward along a path 401 about an axis 601 to a completely folded position 801 or the end panel 201 may fold outward along a path 402 about an axis 601 to a second completely folded position 803. In one embodiment the axis 601 also is the location of the connection between the lower edge of the side panel and the leg 103. Thus, in the embodiment of FIG. 6, the end panel 201 may have up to approximately 270 degrees of motion between an inward folded position 801 to an outward folded position 803. This embodiment also shows an upright position 802 substantially perpendicular to the plane of the face of the base 101 and a folded position 801 for the end panel 201 substantially parallel to the plane of the face of the base 101. In one embodiment, the end panel 201 is configured to remain attached to the collapsible container 100 when folding inward or outward to completely folded positions 801 or 803 from an upright position 802. In other embodiments (not shown) the end panel 201 may be folded by utilizing a pivot or hinge or a flexible material attached to the end panel 201.

Figure 7:
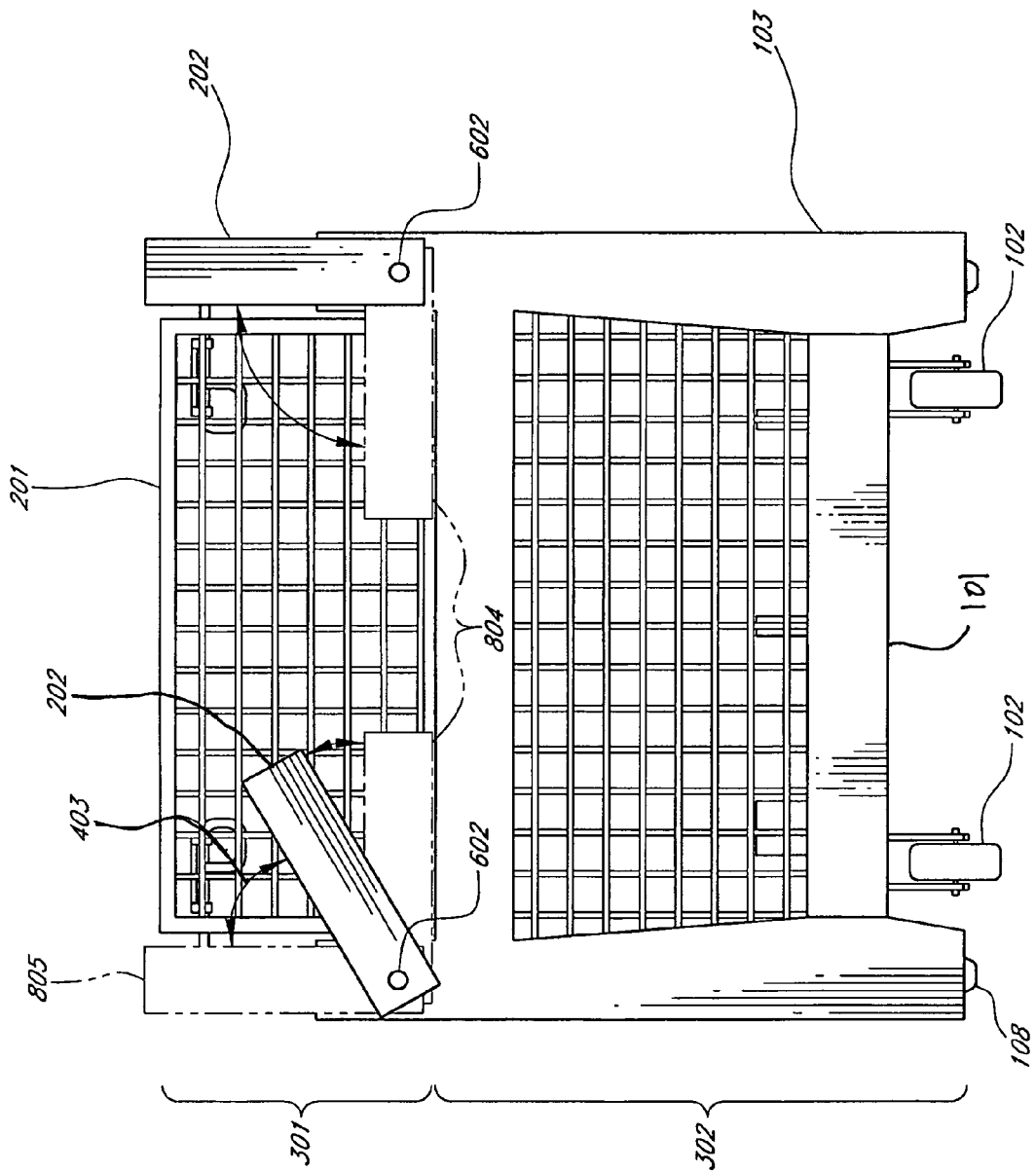
FIG. 7 is a cut-away view of the collapsible container of FIG. 1 taken along the lines 7-7 and viewed in the direction of the arrows labeled 7.

FIG. 7 is a cut-away view of the collapsible container 100 of FIG. 1 taken along the lines 7-7 and viewed in the direction of the arrows labeled 7. FIG. 7 shows an end panel 201 in an upright position as discussed above with reference to FIG. 6.

In this embodiment, a leg extension member 202 locks in an upright position 805. The leg extension member 202, attached to the side panel 204, may "fold" by rotating or pivoting 403 about an axis 602 from an upright and locked position 805 to a folded position 804. The axis 602 is formed by the connection between the leg extension member 202 and the leg 103. The axis of rotation 602 is located below the top of the leg 103 so that when the leg extension member 202 is in a folded position 804, the top of the leg 103 is exposed. In this folded position 804, the exposed leg 103 may support a second collapsible container 101 as will be explained in greater detail with reference to FIG. 9. Thus, in the embodiment of FIG. 7, the leg extension member 202 folds about the axis 602 to a folded position 804 which is approximately 90 degrees from an upright position 805. In this embodiment, the upright position 805 is substantially perpendicular to the base 101 and the folded position 804 is substantially parallel to the base 101. In one embodiment, the leg extension member 202 is configured to remain attached at the axis of rotation 602 when it is folding 403 to a folded position 804 from an upright position 805. In other embodiments (not shown) the leg extension member 202 may be folded by utilizing a pivot or hinge or a flexible material attached to the leg extension member 202 or to the side panel 204.

Figure 8:
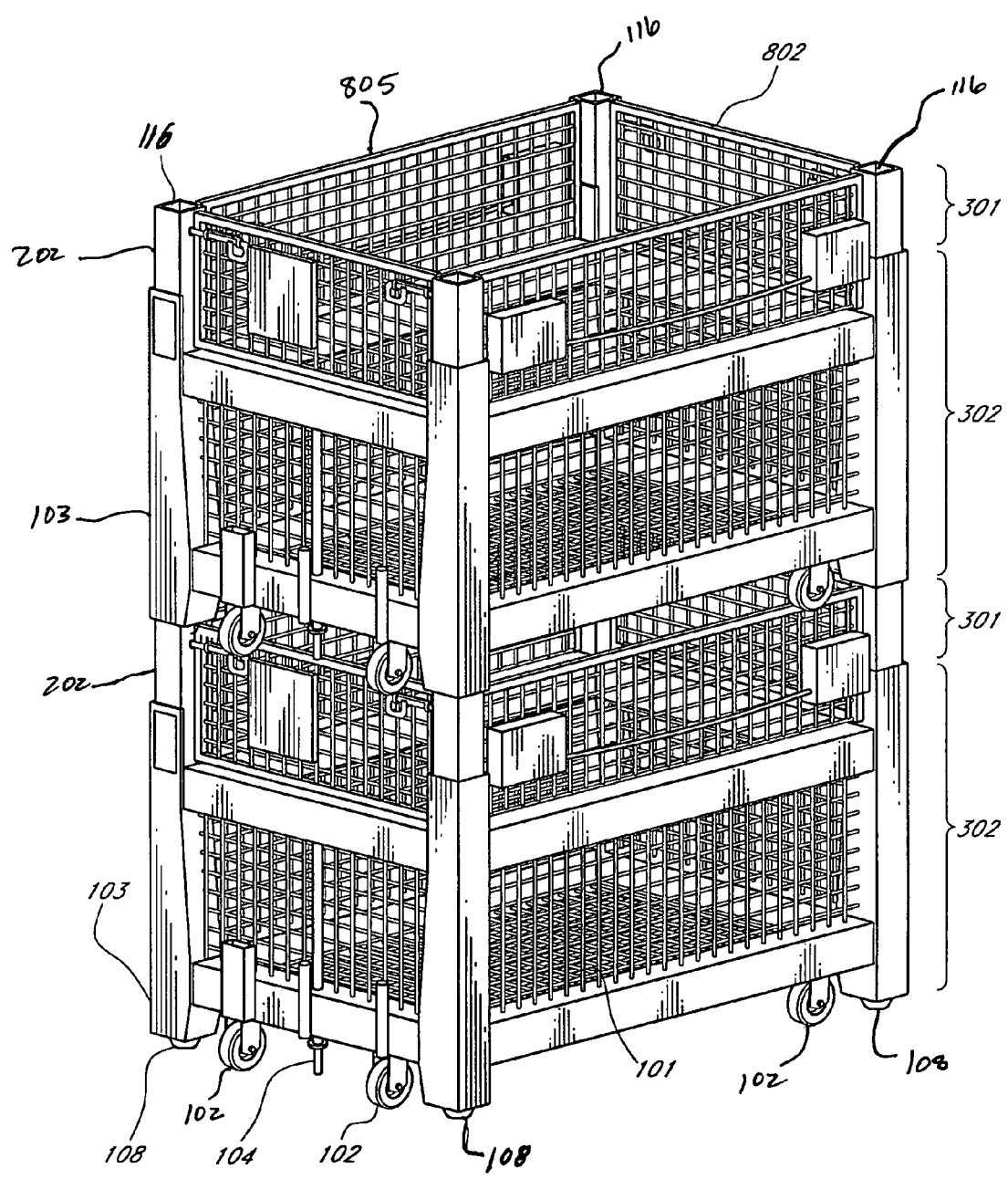
FIG. 8 is a perspective view illustrating two collapsible containers stacked one on top of the other with all panels in upright and locked positions.

FIG. 8 is a perspective view illustrating two collapsible containers 100 stacked one on top of the other with all panels in upright and locked positions.

Cavities 116 or protrusions 108 are also formed in the top of a leg extension member 202 so that when the leg extension member 202 is in an upright and locked position 805, a cavity 116 or protrusion 108 may mate with a corresponding protrusion 108 or divot 107 (or cavity 116) on the legs of a collapsible container 100 as shown when two unfolded collapsible containers 100 are stacked one on top of another. This stacking configuration is illustrated in FIG. 8.

The design of the collapsible container 100 allows for a variety of stacking configurations. In one embodiment of FIG. 8, when the end panels 201 and the side panels 204 (including leg extension members 202) are in their upright and locked positions (802 and 805 respectively), one collapsible container 100 may be stacked on top of another. Of the support members on all of the stacked collapsible containers 100 in this stacked configuration, only the support members (here casters 102) on the bottom collapsible container 100 are weight bearing. Different stacking configurations of the collapsible container 100 may also be used depending on the location of the stacking. For example, depending on the size of the truck or trailer carrying the collapsible containers 100, it is possible that collapsible containers 100 may be stacked either in an open or in a folded position.

Figure 9:
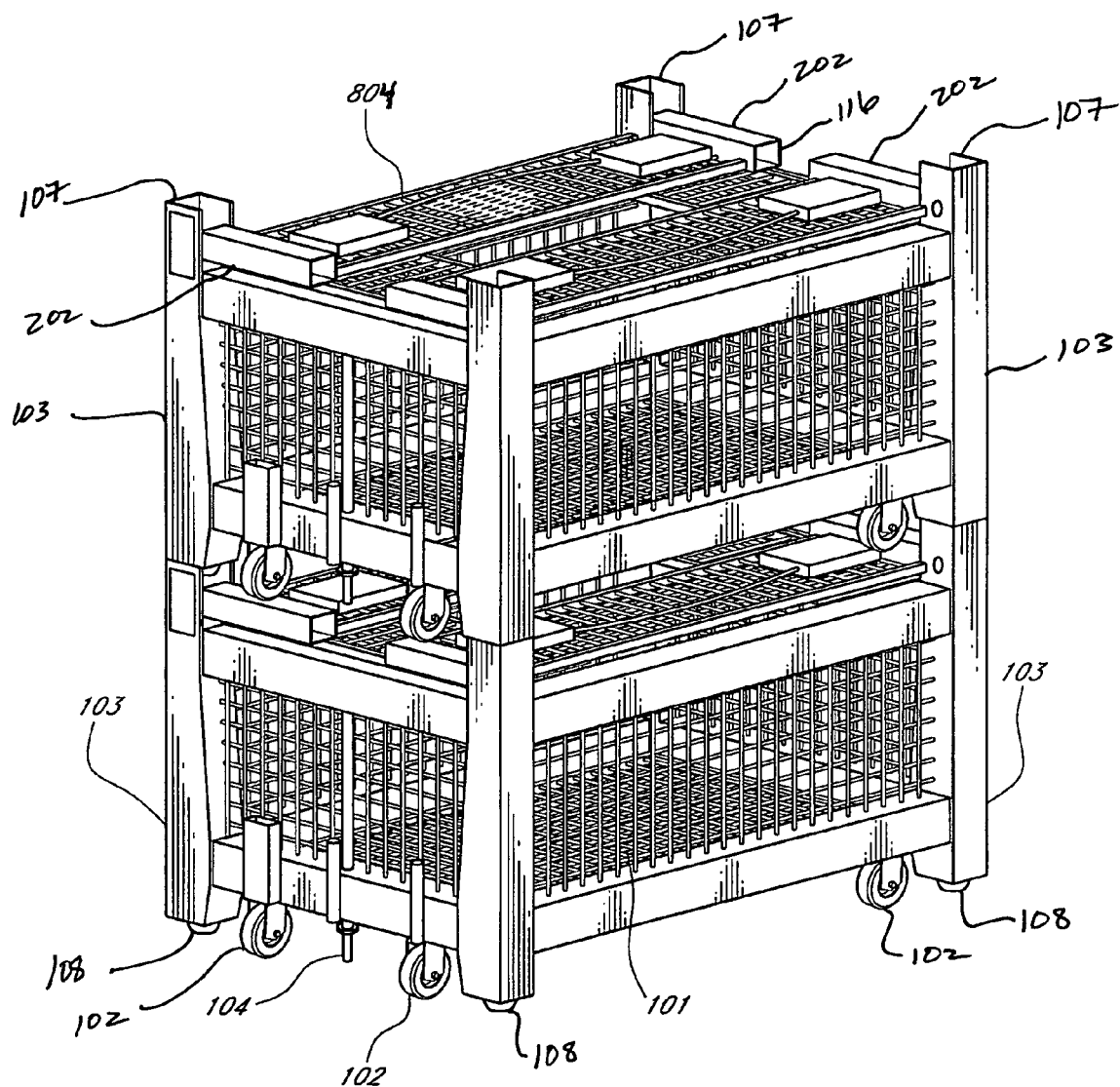
FIG. 9 is a perspective view of the two collapsible containers of FIG. 8 stacked one on top of the other with all panels in folded positions.

FIG. 9 is a perspective view of the two collapsible containers 100 stacked one on top of the other with all panels in folded positions. The legs 103 are configured to support a second collapsible container 100 placed on top of a first collapsible container 100. As discussed previously, in some embodiments, the legs 103 have at least two ends. One end of a leg 103 may include a divot 107 or protrusion 108 designed to mate with a corresponding protrusion 108 or divot 107 in the top of the leg 103 so that when the leg extension members 202 are in a folded position 804, a divot 107 or protrusion 108 may mate with a corresponding protrusion 108 or divot 107 in the leg 103 of a second collapsible container 100 stacked on top of a first collapsible container 100. Divots 107 and protrusions 108 in this embodiment are designed and configured as discussed above.

In one embodiment a side panel 204 including leg extension members 202 that has folded to a completely folded position 804 exposes divots 107 on the top of the legs 103 of a first collapsible container 100 and allows the divots 107 to mate with corresponding protrusions 108 on the base of the legs 103 of a second collapsible container 100 to rest on the divots 107 of the first collapsible container 100. As in stacked configuration of FIG. 8, of all of the support members on all of the stacked collapsible containers 100 in FIG. 9, only the support members on the bottom collapsible container 100 are weight bearing.

Figure 10:
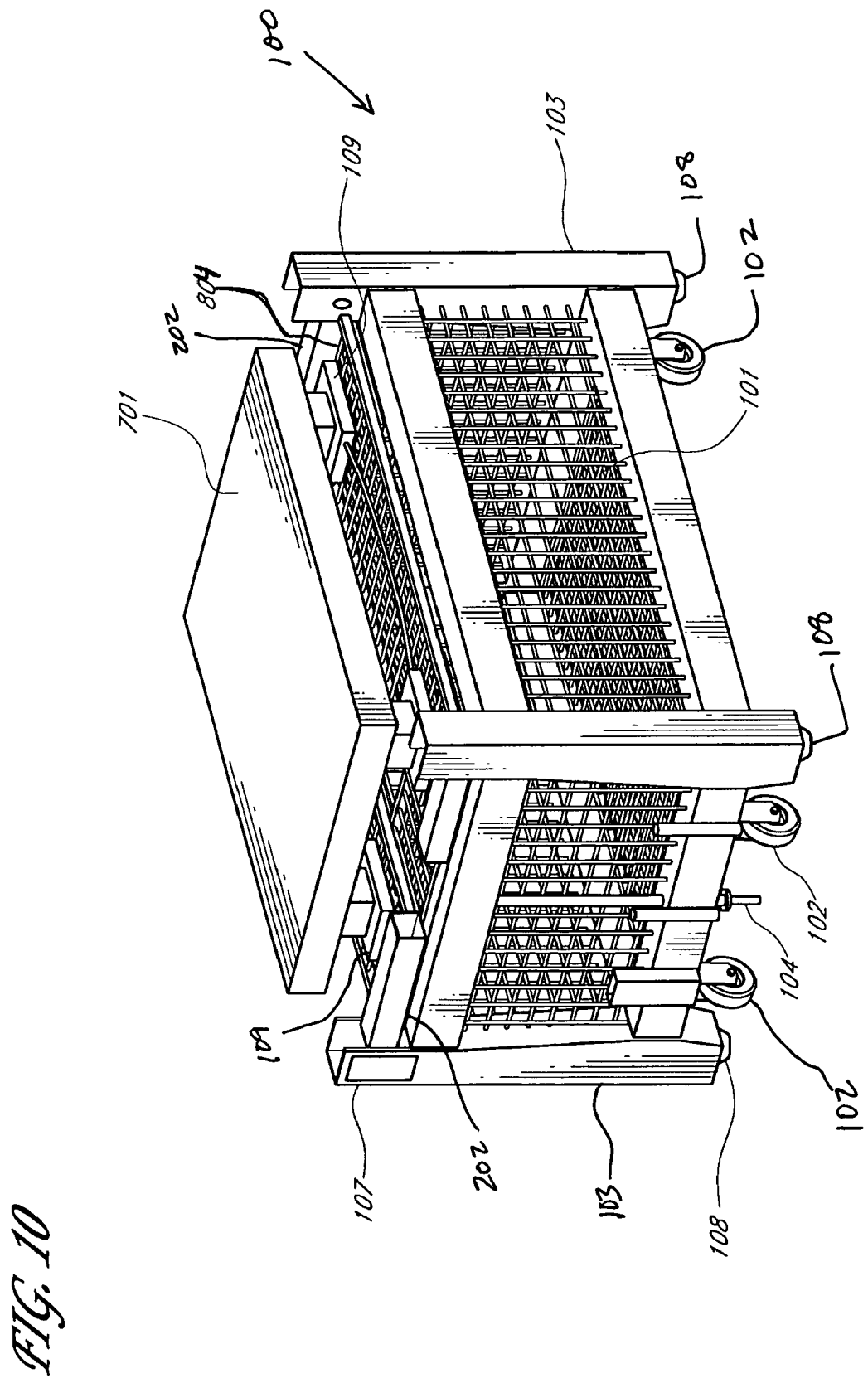
FIG. 10 is a perspective view of a collapsible container in a folded position with a pallet placed on top.

FIG. 10 is a perspective view of a collapsible container 100 in a folded position with a pallet 701 placed on top. The side panel 204 in this embodiment is shown in a completely folded position 804. When the side panel 204 including leg extension members 202 is in a completely folded position, the housing of the spring-loaded slam latches 109 serves to receive the legs supporting the pallet 701. The housing of the spring-loaded slam latch 109 and the associated side panel structure must have sufficient strength in this embodiment to support the pallet 701 placed upon it.

Alternatively, when the side panel 204 including leg extension members 202 is in a completely folded position, divots 107 are exposed on the top of the legs 103 of the collapsible container 100. This allows the divots 107 to receive and secure a different embodiment of a pallet 701, which is large enough to extend between the legs 103 of the collapsible container 100 and which is placed on top of the collapsible container 100. As explained above with regard to stacking configurations of multiple collapsible containers 100, divots 107 are nooks in the legs 103 that are exposed when the leg extension members 202 are in a folded position 804. The divots 107 on legs 103 at the corners of the collapsible container 100 may mate with knobs, convex members, or protrusions on the base of the pallet 701 to thereby secure the pallet 701. The knobs are merely protrusions or convex members that may attach to the pallet 701 or may be part of a continuous structure of the pallet 701. The pallet 701 may also be anchored to the collapsible container 100 by the corners of the pallet 701 fitting inside of the divots 107 to thus anchor the collapsible container 100. The pallet 701 is thus restrained or anchored by the divots 107 so as to prevent the pallet 701 from sliding off the collapsible container 100. The pallet 701 (including any parts thereof including the knobs) may be made of wood, metal, plastic, rubber, fiberglass, or other materials used in commercial and industrial grade pallets.

Figure 11:
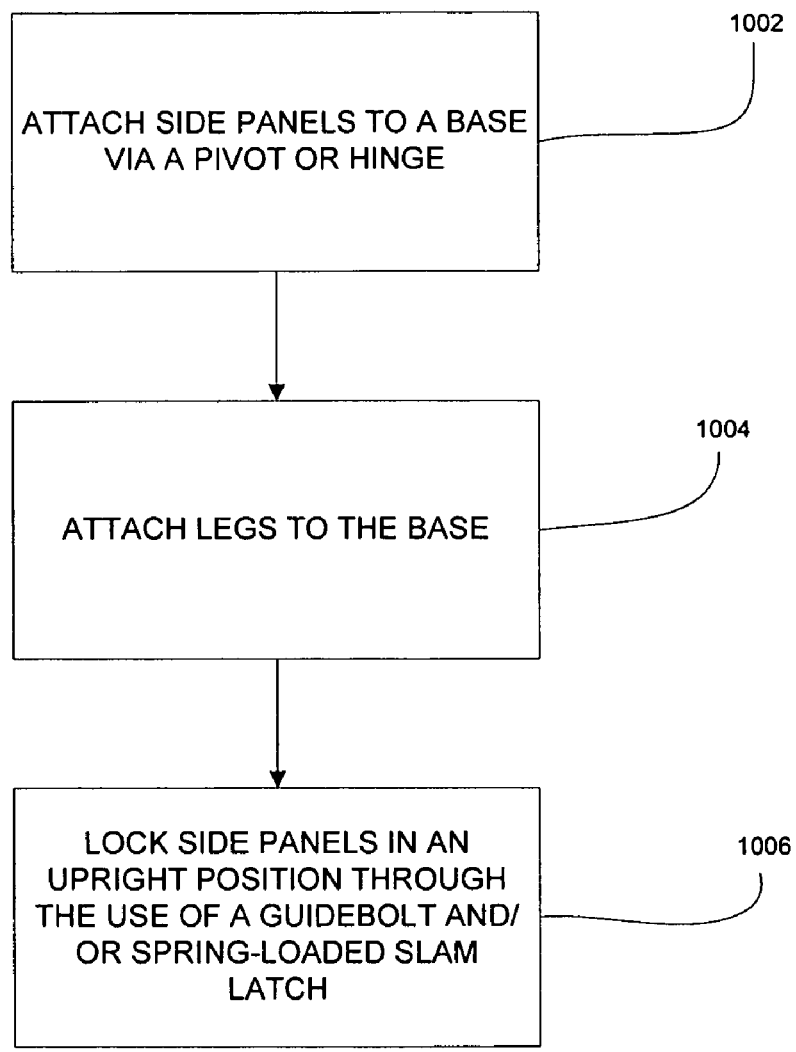
FIG. 11 is a block diagram illustrating a method of manufacturing a collapsible container.

One embodiment of the invention comprises a method of manufacturing a collapsible container 100. This method, illustrated in FIG. 11, comprises the step 1002 of attaching side panels to a base 101 via a pivot or hinge. In step 1004 the legs 103 are attached to a base 101. In step 1006, the side panels are locked in an upright position through the use of a guidebolt 203 and/or spring-loaded slam latch 109.

Figure 12:
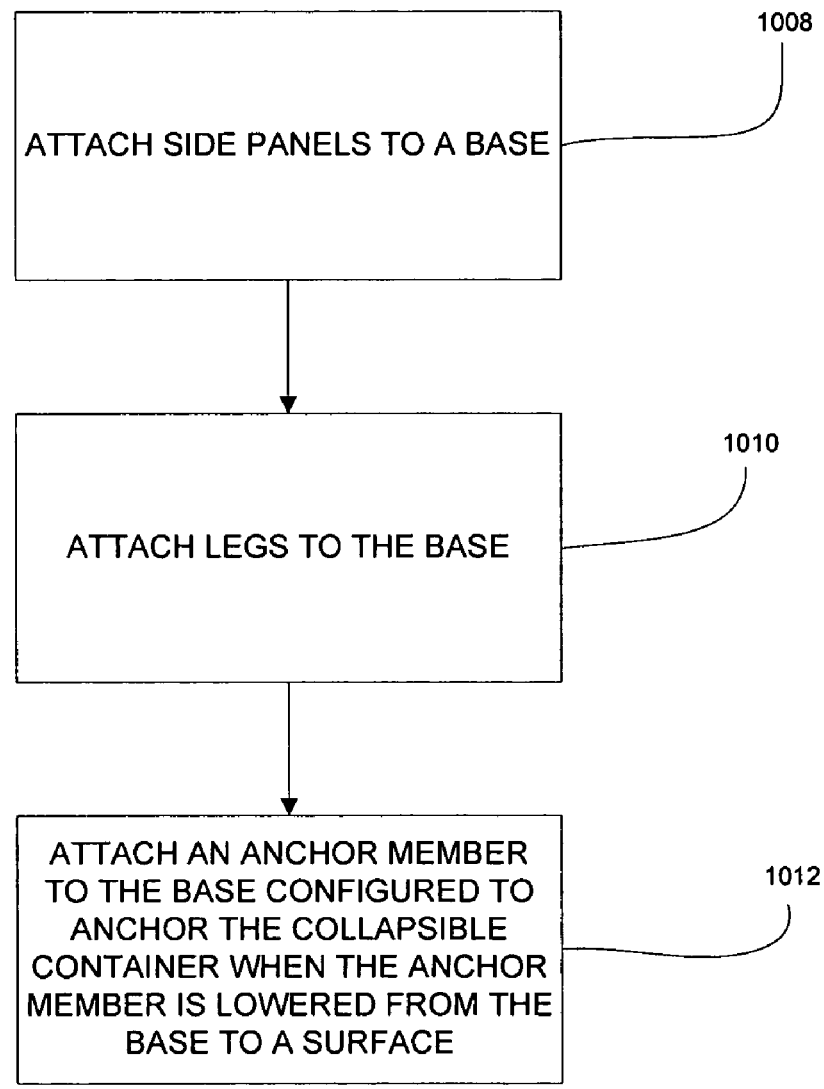
FIG. 12 is a block diagram illustrating a method of manufacturing a collapsible container.

One embodiment of the invention comprises a method of manufacturing a collapsible container 100. This method, illustrated in FIG. 12, comprises the step 1008 of attaching side panels to a base 101. Step 1010 then comprises attaching legs 103 to the base 101. Then, step 1012 comprises attaching an anchor member to the base 101 configured to anchor the collapsible container when the anchor member is lowered from the base 101 to a surface.

Figure 13:
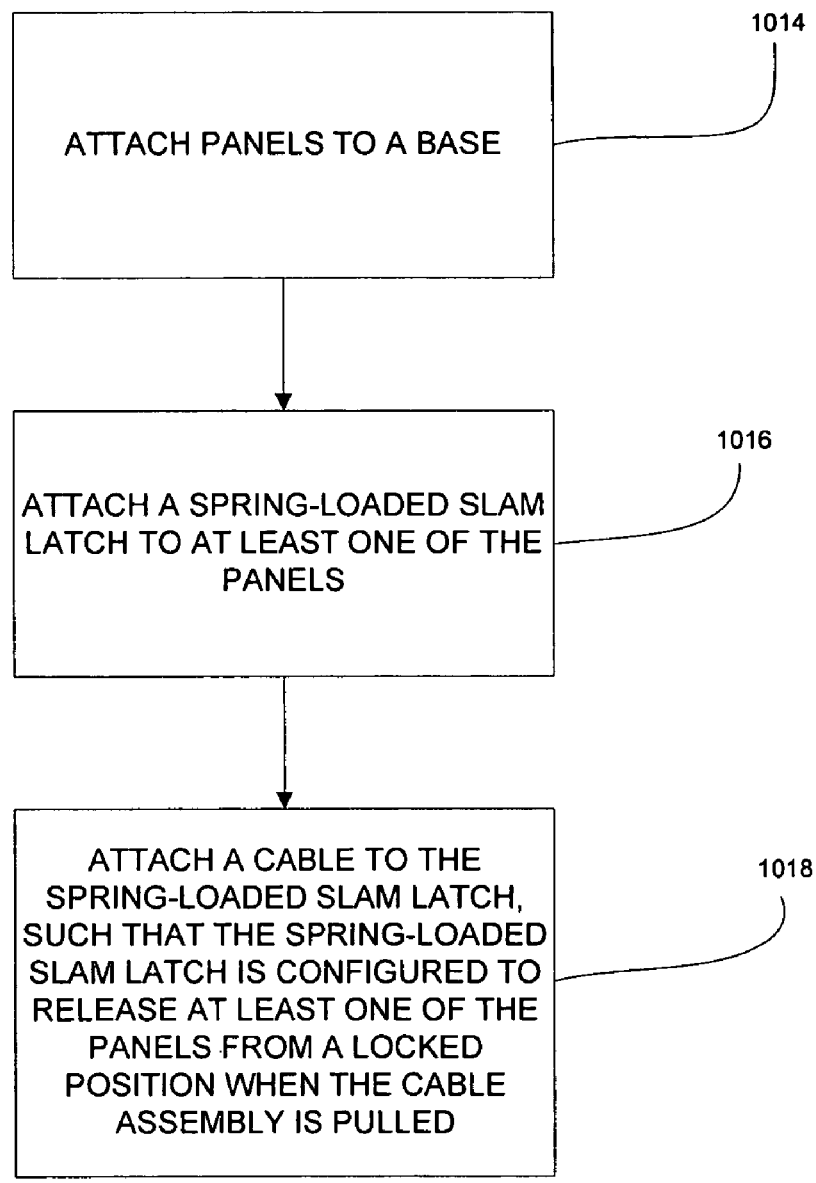
FIG. 13 is a block diagram illustrating a method of manufacturing a cable assembly for use in a collapsible container.

One embodiment of the invention comprises a method of manufacturing a cable assembly. This method, illustrated in FIG. 13, comprises the step 1014 of attaching panels to a base 101. In step 1016 a spring-loaded slam latch 109 is attached to at least one of the panels. Then, in step 1018 a cable 110 is attached to the spring-loaded slam latch 109, such that the spring-loaded slam latch 109 is configured to release at least one of the panels from a locked position when the cable assembly 110 is pulled.

Figure 14:
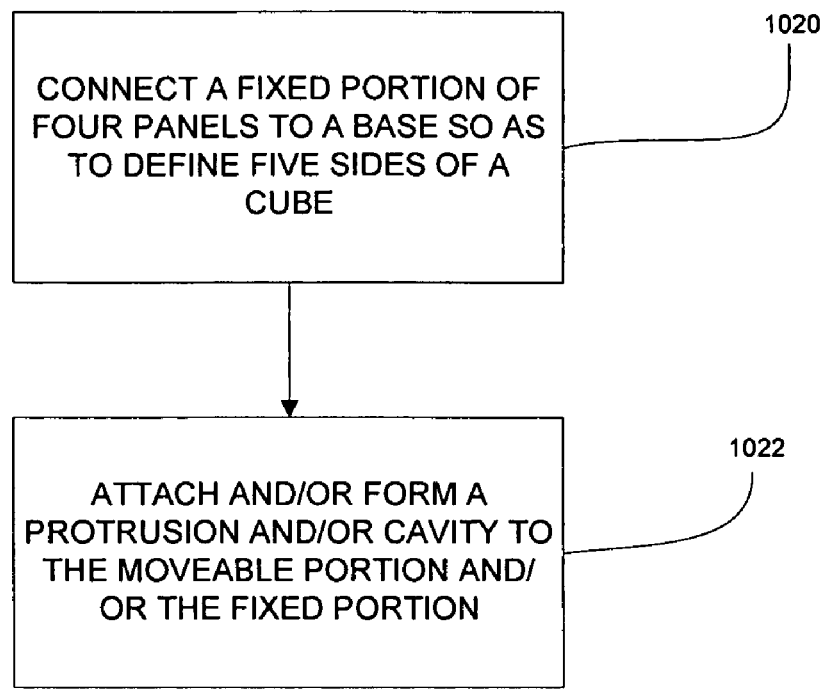
FIG. 14 is a block diagram illustrating a method of manufacturing a collapsible container.

One embodiment of the invention comprises a method of manufacturing a collapsible container 100. The collapsible container comprises four panels, wherein each panel comprises a moveable portion 301 and a fixed portion 302 and wherein each panel is comprised substantially of wire matrix. The method, illustrated in FIG. 14, comprises the step 1020 of connecting the fixed portion of the four panels to a base 101 so as to define five sides of a cube. Then, in step 1022 a protrusion 108 and/or a cavity 116 is attached and/or formed to at least one of the moveable portion 301 and the fixed portion 302.

One embodiment of the invention is a method of stacking collapsible containers 100 that comprise side panels and end panels wherein at least one side panel or end panel comprises a fixed portion 302 and a moveable portion 301. The method comprises aligning cavities 116 or protrusions 108 on leg extension members 116 of one of the collapsible containers 100 and protrusions 108 or divots 107 on legs 103 of another of the collapsible containers 100 and placing one collapsible container 100 on top of another. In some embodiments, the method further comprises folding at least one of the end panels 112 or at least one of the side panels 113 about an axis in an inward or outward direction to expose divots 107 on the legs 103. In some embodiments, the method further comprises placing at least one pallet 701 onto the divots 107 of the collapsible container 100. One collapsible container 100 may be secured on top of another collapsible container 100 by utilizing a series of divots 107 or cavities 116 or protrusions 108 on one collapsible container that mate with protrusions 108, legs, casters, wheels, divots 107 or cavities 116 on another collapsible container. A collapsible container 100 may be secured on top of another collapsible container 100 through use of belts, clips, chains or ropes.

It will be appreciated by those skilled in the art that various modifications and changes may be made without departing from the scope of the invention. Such modifications and changes are intended to fall within the scope of the invention, as defined by the appended claims.

What is claimed is:

1. A collapsible container comprising:
a base having top and bottom surfaces;
a plurality of support members attached to said base and configured to support said collapsible container;
legs configured to attach to said base, said legs configured to support a second collapsible container placed on top of said collapsible container; and
a plurality of side panels having edges, wherein each of said side panels is connected to said base along at least a portion of one of said edges, wherein at least one of said side panels has a foldable portion and a fixed portion, wherein at least one of said side panels is configured to lock in place in at least one position via at least two spring-loaded slam latches mechanically connected to a common member so as to disengage in response to a force applied to said common member, and wherein at least one of said side panels is locked in place via at least one guidebolt.

2. The collapsible container of claim 1, wherein each of said side panels connected to said base is positioned on an opposite side of said base from another of said side panels.

3. The collapsible container of claim 1, wherein said side panels comprise a wire matrix.

4. The collapsible container of claim 1, wherein said at least two mechanically connected spring-loaded slam latches are configured to release said at least one of said side panels when a cable assembly is pulled.

5. The collapsible container of claim 1, wherein said legs comprise rigid members.

6. The collapsible container of claim 5 wherein said rigid members are positioned at edges of said base.

7. The collapsible container of claim 1, wherein at least four support members are attached to said base.

8. The collapsible container of claim 7, wherein at least one of said support members is a fixed position caster.

9. The collapsible container of claim 7, wherein at least one of said support members is a swivel caster.

10. The collapsible container of claim 1, wherein said at least one position includes an upright position substantially perpendicular to said base.

11. The collapsible container of claim 1, wherein said at least one position includes a position substantially parallel to said base.

12. The collapsible container of claim 1 comprising means for releasing said at least two spring-loaded slam latches.

13. The collapsible container of claim 1 comprising means for locking said at least two spring-loaded slam latches.

14. The collapsible container of claim 1 comprising means for folding a side panel.

15. A collapsible container comprising:
a base having top and bottom surfaces;
legs attached to said base;
a plurality of side panels, each of said side panels permanently attached to said base; and
leg extension members rotationally attached to said legs, such that in an upward configuration said leg extension members may support a load placed on top of said collapsible container and such that in a folded configuration said legs are the primary load bearing members for a load placed on top said collapsible container.

16. A container comprising:
a base having top and bottom surfaces;
legs attached to said base, said legs configured to support a second collapsible container placed on top of said collapsible container;
a plurality of side panels having edges, wherein each of said side panels is permanently connected to said base along at least a portion of one of said edges, wherein at least one of said side panels has a foldable portion and a fixed portion, and wherein at least one of said side panels is configured to lock in place via a guidebolt or a spring-loaded slam latch;
leg extension members rotationally attached to said legs, such that in an upward configuration said leg extension members may support a load placed on top of said collapsible container and the collapsible container defines an interior space capable of maintaining maximum content of a first volume, and such that in a folded configuration said legs are the primary load bearing members for a load placed on top of said collapsible container and said collapsible container defines an interior space capable of maintaining a maximum content capacity of a second volume that is different than said first volume; and
at least one anchor member attached to said base and extending downwardly from said base, said anchor member configured to anchor said container to a mechanical system configured to produce lateral migration of said container.

17. The container of claim 16, wherein said anchor member is configured to anchor said container to a moving vehicle.

18. The container of claim 16, wherein said anchor member is a tow pin.

19. A collapsible container comprising:
a base having top and bottom surfaces,
four side walls connected to and extending upward from said base, wherein said four side walls are permanently attached to said base;
two side panels, each of said side panels having an edge which is substantially adjacent to and substantially parallel to an edge of said four side walls, wherein said two side panels are configured to fold toward said base;
two end panels, each of said end panels having an edge which is substantially adjacent to and substantially parallel to an edge of said four side walls; and
a label holder located on said collapsible container,
wherein said two end panels are configured to fold toward said base, and
wherein said two side panels and said two end panels may be locked in a position extending upward from said base so that said base, said four side walls, said two side panels and said two end panels form five sides of said collapsible container.

20. The collapsible container of claim 19, wherein said two side panels are configured to remain attached to said collapsible container when folding towards said base and when in a completely folded position.

21. The collapsible container of claim 19, wherein said two end panels are configured to pivot inward or outward when folding towards said base.

22. The collapsible container of claim 19, wherein said two side panels are configured to remain attached to said collapsible container when folding inward and towards said base.

23. The collapsible container of claim 19 further comprising legs attached to said base that extend upward from said base, said legs configured to provide support for at least one of said four walls.

24. The collapsible container of claim 23, wherein said legs are rigid members with each rigid member having at least two ends.

25. The collapsible container of claim 24 further comprising recesses on one end of said rigid members and protrusions on another end of said rigid members, wherein said protrusions are configured to rest in said recesses when one collapsible container is stacked upon another.

26. The collapsible container of claim 19, wherein a plurality of said collapsible containers are configured to be stacked three high when said collapsible containers are empty and/or when said end panels and said side panels comprising leg extension members are in a folded position.

27. The collapsible container of claim 26, wherein said collapsible containers are configured be stacked two high when said side panels and said leg extension members are locked in an upright position.

28. The collapsible container of claim 19, wherein the label holder comprises a label holder pocket.

29. The collapsible container of claim 19, wherein the label holder comprises a display panel for routing and/or handling information.

30. The collapsible container of claim 19 comprising means for folding a side panel about an axis.

31. The collapsible container of claim 19 comprising means for folding an end panel about an axis in an inward or outward direction.

32. The collapsible container of claim 15, wherein when the leg extension members are in the upward configuration, the collapsible container maintains a first volume and wherein when the leg extension members are in the folded configuration the collapsible container maintains a second volume.

33. The collapsible container of claim 32, wherein the first volume is greater than the second volume.

34. The collapsible container of claim 32, wherein the second volume is configured to receive goods.

35. A collapsible container comprising:
a base having top and bottom surfaces;
legs attached to said base;
a plurality of side panels attached to said base; and
leg extension members attached to said legs, such that in a first configuration said leg extension members will support a load placed on top of said collapsible container and the collapsible container defines an interior space capable of maintaining maximum content capacity of a first volume, and such that in a second configuration said legs are the primary load bearing members for a load placed on top of said collapsible container and said collapsible container defines an interior space capable of maintaining maximum content capacity of a second volume that is different than said first volume.

* * * * *

UNITED STATES PATENT AND TRADEMARK OFFICE
CERTIFICATE OF CORRECTION

| | | |
|---|---|---|
| PATENT NO. | : 7,708,160 B2 | Page 1 of 1 |
| APPLICATION NO. | : 11/329405 | |
| DATED | : May 4, 2010 | |
| INVENTOR(S) | : Booth et al. | |

It is certified that error appears in the above-identified patent and that said Letters Patent is hereby corrected as shown below:

In the Specification:

At Column 1, Line 26, change "is a" to --is configured to lock in place in at least one position and at least one of the side panels has both a--.

At Column 6, Line 62, change "FIG. 2" to --FIG. 2.--.

Signed and Sealed this

Twenty-sixth Day of October, 2010

David J. Kappos
*Director of the United States Patent and Trademark Office*